United States Patent [19]
Friedman et al.

[11] Patent Number: 5,995,959
[45] Date of Patent: Nov. 30, 1999

[54] METHOD AND SYSTEM FOR NETWORK INFORMATION ACCESS

[75] Inventors: Marc T. Friedman; Chung T. Kwok; Daniel S. Weld, all of Seattle, Wash.

[73] Assignee: The Board of Regents of the University of Washington, Seattle, Wash.

[21] Appl. No.: 09/012,441

[22] Filed: Jan. 23, 1998

Related U.S. Application Data

[60] Provisional application No. 60/035,844, Jan. 24, 1997.
[51] Int. Cl.$^6$ ....................................................... G06F 17/30
[52] U.S. Cl. ........................................ 707/3; 707/4; 707/5
[58] Field of Search .................................. 707/2, 3, 4, 5; 709/217–219, 200, 201

[56] References Cited

U.S. PATENT DOCUMENTS

| | | |
|---|---|---|
| 4,769,772 | 9/1988 | Dwyer ........................................... 707/2 |
| 5,600,831 | 2/1997 | Levy et al. ..................................... 707/2 |

*Primary Examiner*—Paul V. Kulik
*Attorney, Agent, or Firm*—Pennie & Edmonds LLP

[57] ABSTRACT

This invention provides methods to locate and plan the retrieval of data from networked information sources in response to a user query. The methods utilize descriptions of the information sources, the information domain of the sources, and of the query. The methods of this invention integrate both legacy systems and full relational databases with an efficient, domain-independent, query-planning algorithm, reason about the capabilities of different information sources, handle partial goal satisfaction i.e., gather as much data as possible when all that the user requested cannot be gathered, are both sound and complete, and are efficient.

11 Claims, 2 Drawing Sheets

METHOD AND SYSTEM FOR NETWORK INFORMATION ACCESS

This application claims benefit of provisional application Ser. No. 60/035,844 filed Jan. 24, 1997.

This invention was made with Government support from the Office of Naval Research under grant N00014-94-1-0060, from the National Science Foundation under grant IRI-9303461, and from the ARPA/Rome Labs under grant F30602-95-1-0024. The Government has certain rights in the invention.

1. FIELD OF THE INVENTION

The field of this invention relates to information access over networks, and specifically to the automatic location and retrieval of information available from networked information sources in response to user information queries.

2. BACKGROUND

The exponential growth of private intranets and the public Internet has produced a daunting labyrinth of increasingly numerous documents, databases and utilities. Almost any type of information is now available somewhere, but most users cannot find what they seek, and even expert users waste copious time and effort searching for appropriate information sources. A first problem is simply the increasingly large number of available information sources that are beyond the comprehension of a single user. A second problem, along with this growth in available information and information sources, is a commensurate growth in software interfaces and methods to manage, access, and present this information. Sources are managed by different organizations, hence agents, whether human or automated, must adhere to the remotely defined formats. The information sources are potentially slow and expensive, so users must balance the cost of each access against its estimated benefit. The information sources are dynamic, hence an agent must recognize when an existing sources's contents, protocol or performance changes, as well as when new sources come online and existing sources leave. Many sources represent legacy systems in the sense that they do not support a comprehensive query interface such as SQL; in these cases an agent needs to expend additional effort to determine the best way to answer an information gathering request.

Artificial intelligence and database researchers have addressed this problem by constructing integrated information gathering systems that automatically query multiple, relevant information sources to satisfy a user's information request. See, e.g., [9, 5, 12, 15, 18, 16, 25, 29, 10]. These systems raise the level of the user interface, since they allow the user to specify the information of interest without specifying where it is stored or how to access the relevant sources [9]. Several researchers in the database community are concerned with the integration of heterogenous database. Prominent projects include the Information Manifold ([14]) and the Tsimmis project ([5, 25]). Generally, however, Tsimmis project assumes information integration is done manually and not automatically. Other work that mentions automatic integration provides no suggestion of the necessary methods ([18]).

Most prior work on AI planning systems ([1]) assumes that execution of an operator instance has a causal effect on the world, which leads to more complex methods and slower planning than are useful for automatic information access. Several planning systems have been designed for information gathering, for example, the XII planner ([9, 12]) and the Sage planner ([2, 15]). However, neither of these examples can represent information sources that generate information which translates into partially specified sentences in an information domain model, because they are unable to handle unbound variables with sufficient generality. Neither are they able to represent an incomplete source that returns variable numbers of tuples. These systems typically use cumbersome and inflexible representations of information domains and sources. Further, most of the planners described above have significant combinatorial explosions and require domain-specific, search control for anything but small problems.

3. SUMMARY OF THE INVENTION

It is a broad object of this invention to provide automatic information location and retrieval methods that: integrate both legacy systems and full relational databases with an efficient, domain-independent, query-planning algorithm; reason about the capabilities of different information sources; handle partial goal satisfaction i.e., gather as much data as possible when the methods cannot gather exactly all that the user requested; are both sound and complete; and are efficient.

In contrast to previous work on AI planning, the automatic information access methods of this invention use a data representation including an action language for operators and plans that is designed to represent information sources in a manner enabling a highly specialized planning algorithm. For example, the only preconditions to operators are knowledge preconditions, which are represented as bound arguments. Furthermore, since the operators executed are requests to information sources for information, the methods of this invention do not model causal effects. Hence, there are no sibling-subgoal interactions, such as those characterizing the Sussman anomaly. These methods do not model a world state as do many other AI planners; instead they model an information state, which is a description of the information collected at a particular stage in the potential execution of a potential query plan.

In contrast to work on multi-database systems, the information access methods of this invention provide a single, unified information-domain model that is independent from any model employed by the information sources accessed. Such a model greatly simplifies integration of new sources into the system of this invention. Moreover, these methods are expressive since they are able to model the presence of incomplete information in sources, and, importantly, are equally adept at extracting information from both legacy systems and full relational databases.

Accordingly in one embodiment, the automatic information access methods of this invention include planning methods, which automate the process of locating relevant information sources from a repository of source models and combining them appropriately to answer users' information queries. One important aspect of this embodiment is that it can integrate both legacy systems and full relational databases. Other important aspects are that these query-planning methods are efficient, domain-independent, sound and complete. Further, they run at practical speeds. Empirical results are presented demonstrating practical performance on a variety of information gathering tasks.

In one alternative, the methods of this invention utilize a forward chaining search procedure in order to search from descriptions of information sources to an information access plan satisfying a user information query. In another alternative embodiment, these planning methods use a backward chaining search procedure to search from a user query to an information source access plan satisfying this query.

In another aspect, the methods of this invention use a compact representation ("language") of information domains and sources. For example, quantification is implicit and hence concise. Variable binding patterns allow a parsimonious encoding of knowledge preconditions. The information domain model is flexible, since data relations can be combined using unbound variables and implicit joins. As a result, domain descriptions according to this invention are short and thus easy to define and debug.

4. BRIEF DESCRIPTION OF THE DRAWINGS

These and other features, aspects, and advantages of the present invention will become better understood by reference to the accompanying drawings, following description, and appended claims, where:

5. DETAILED DESCRIPTION

Section 5.1 describes the representation (also called herein "language") of the information domain, of information sources in the domain, and of user queries. Section 5.2 describes the general method of automatic information access according to this invention. Section 5.3 then describes the planning methods in more detail. Finally, section 5.4 describes an alternative embodiment of the planning methods.

In the following description, terms are used in the standard manners familiar to those of skill in the arts of computer software and computer science. In particular, the notational conventions of the Prolog language are used. Hence, symbols beginning with a capital letter denote variables. All free variables are universally quantified. All variables in a body that don't appear in the arguments are said to be unbound and are considered existentially quantified inside the scope of the free variables. The function Args(O) denotes the arguments of the operator O; Body(O) denotes the operator's body; and Name(O) denotes its name.

5.1. REPRESENTATION OF DOMAINS, SOURCES, AND PLANS

Figure 1:
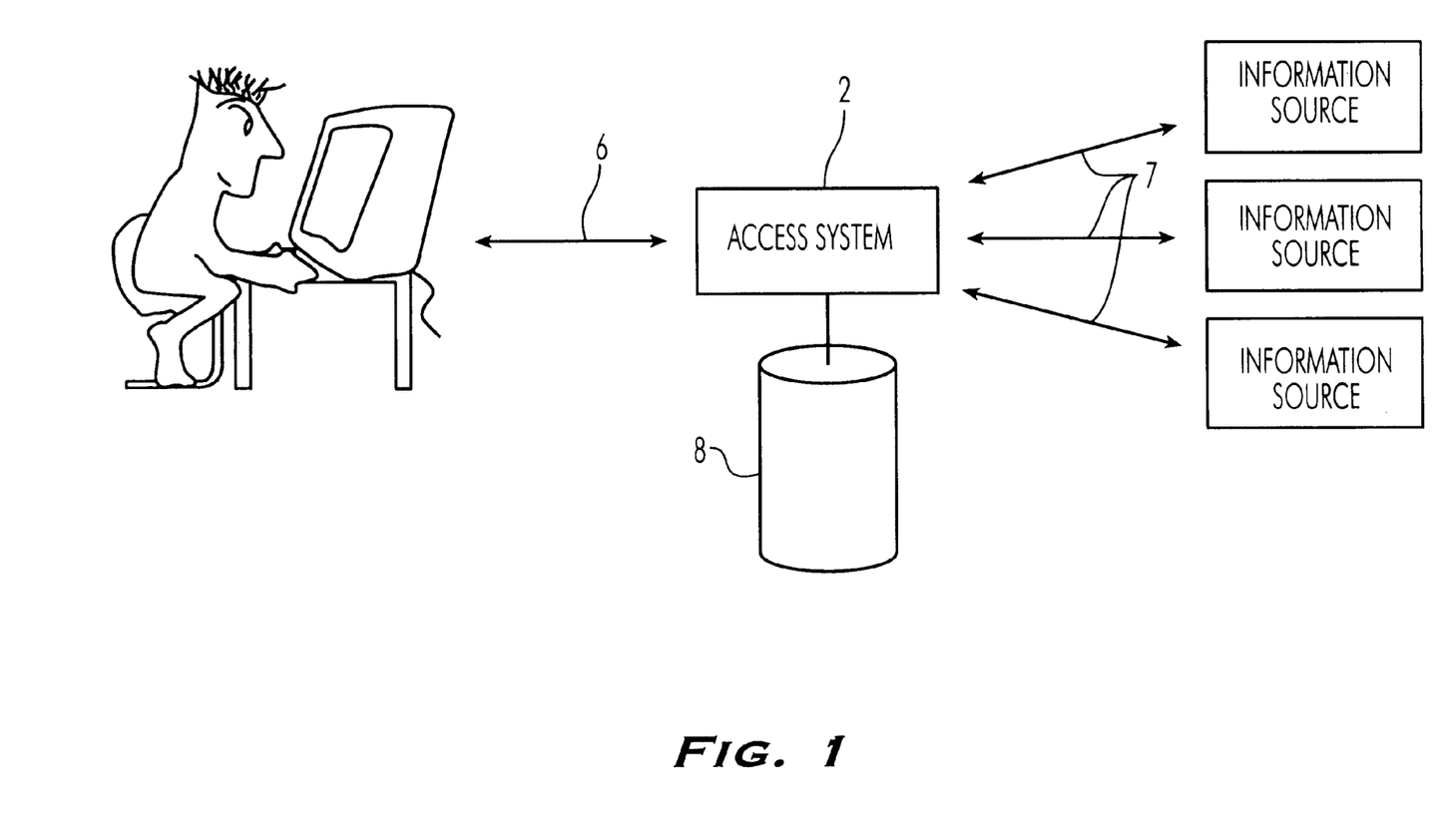
FIG. 1 illustrates the system of this invention.

FIG. 1 illustrates the environment of this invention. User 1 is attached to access system 2 by link 6. Access system 2 can be either local to, or remote from, user 1, with link 6 providing appropriate communication between the user and the access system. Access system 2 is connected to a plurality of information sources, such as sources 3, 4, and 5, by interconnection 7. Interconnection 7 is typically a network connection, such as the public Internet or a private intranet, in which cases the information sources can be widely distributed. Such connections between access system 2 and the information sources are managed by the TCP/IP suite of protocols, including application level protocols such as HTTP, FTP, and so forth.

Without assistance from access system 2, user 1 necessarily interacts directly with each separate information source to obtain information relevant to information queries. These sources are managed by different organizations; hence the user must adhere to the remotely defined formats. The information services are potentially slow and expensive; hence the user must balance the cost of each access against its estimated benefit. The information sources are dynamic; hence the user must recognize when a site's contents, protocol or performance changes, as well as when new sites come online and existing sites leave. Many sources represent legacy systems in that they do not support a comprehensive query interface such as SQL; in these cases the user can expend additional effort to determine the best way to extract the information from the source according to its individual access commands.

The problems facing an unassisted user can be illustrated by a simple example. Suppose the user wants to find out the names of all people in an office. If the user knew of a relational database containing this information, gathering the information would require only a simple SQL command. But suppose no such database exists. Instead, the user has available only two legacy information sources, namely, the UNIX finger command, which returns the names of people given their email addresses, and the UNIX userid-room command, which returns email addresses of all the occupants in the office. In order to find the names of the office's inhabitants, the user must combine these sources: first issuing the userid-room command and then running finger on each of the email address returned.

Such problems are overcome by this invention, which provides automatic information location and retrieval methods run on access system 2 in order to assist the user. These methods reason about the capabilities of information sources, e.g., legacy sources such as finger, userid-room as well as more powerful relational databases, in order to synthesize a sequence of information-access commands that will gather the requested information. Such an ordered sequence of information-access commands is called herein a "plan." Since the methods have access to information source representations that can indicate that information sources may not be exhaustive, that may not store all possible values of their information types, when necessary the methods generate multiple plans in order to gather as much information as possible.

In this manner, the methods of this invention provide considerable assistance to user 1's information access tasks by planning a sequence of access requests to networked information sources, such as sources 3, 4, and 5, that retrieves information satisfying the user's queries. The planning and retrieving methods according to this invention utilize a database of data structures representing the information domain, to which the user's queries are related, and the networked information sources to be accessed, in order to satisfy the queries. These data structures are typically stored for access by the methods of this invention in storage device 8 attached to access system 2, where these methods are executed for providing assistance to user 1.

These data structure are described in the following paragraphs of this section. Following these data descriptions, representations for user queries and for the plans constructed by the planning methods of this invention are presented. These descriptions are illustrated by elaboration of the previously introduced legacy UNIX example.

Representing Information Domains and Information Sources

The location and retrieval methods of this invention allow the user to interact with networked information sources through a single, unified, relational database schema called an "information domain model" or a "domain model." A domain model includes one or more relational schema, which represent particular aspects of knowledge in an information domain of interest to a user. A relational schema includes one head, which names the schema, and one or more attributes, or arguments to the schema, which indicate the types of facts related together by the schema. The relational schema represents that particular facts of the indicated types are related together in a state of affairs of the world according to this aspect of domain knowledge. See, e.g., Ullman, 1988, *Database and Knowledge-Base Systems*, vol. 1, Computer Science Press, and Ullman, 1989, *Database and Knowledge-Base Systems*, vol. 2, Computer Science Press, both of which are herein incorporated by reference in their entireties.

For example, a domain model can represent information about a person's email addresses with the relation schema email(F,L,E), where F, L, and E represent the attributes or arguments firstname, lastname and email address respectively. Another relation schema office(F,L,O) can represent that the person with firstname F and lastname L has office O.

The data structures of this invention are strongly typed, in that a type is associated with each attribute or argument. Each variable is also typed and can stand for facts having that type. In other words, a variable can only stand for an attribute or argument in a relation or predicate if the two types match. For example, within the email(F,L,E) relation, F and L are have the type "name," and E has the type "email."

In view of the domain model, networked information sources, or information-producing sites along with other data producing sites, are represented by modeling the type of information queries they are capable of responding to and by specifying a mapping between the output of such queries and relational schema in the information domain model. Both purposes are achieved with data structures, known herein as "operators," which have two syntactic parts:

1. A first part, called a "head," which is a predicate symbol denoting the name of the operator, and an ordered list of variables, which are the arguments of the operator. Each variable is possibly annotated with a binding pattern, which indicates that the argument must be bound in order for the query to be executed by the associated information source. A bound variable is prefixed with a "$." Variables without "$" prefix are called free.
2. A second part, called a "body," which is a conjunction of atomic formulae whose predicate symbols denote relational schema in the information domain model.

Operators are denoted by expressions with the head on the left, an implication symbol, and the body on the right. The following expression denotes an operator named "op."

op($X_1, \ldots, X_n$)⇒$rel_1$ ( $\ldots, X_i, \ldots$ ) ∧ $\ldots$ ∧$rel_m$ ( $\ldots, X_j, \ldots$ )

This specification says that when the operator "op" is executed as a query, against the information source whose description it is a part of, it will return one or more tuples of data. Each returned tuple represents an assignment of values to the arguments $X_1, \ldots, X_n$ of the head. For each returned tuple, the operator specification states that the logical formula formed by replacing all occurrences of the arguments in the relational schema in the body with the corresponding values of the returned tuples is satisfiable. A formula is satisfiable if there is a state of affairs such that the remaining unassigned arguments in the relational can be assigned values consistently with partial assignment indicated by the returned tuple.

For example, the UNIX finger command can be modeled by the following operator:

finger (F,L,$E,O,Ph)⇒email(F,L,E)∧office(F,L,O)∧phone (O,Ph)

This means that when given an email address, the bound variable $E, finger produces a set of variable bindings for the free variables, F, L, O, and Ph. Since binding annotations are required only for variables appearing as arguments, the use of $E in the head denotes the same variable as E in the relational schema in the body. When E is bound to "sam@cs", the following tuples might be returned:

<"Sam","Smith","sam@cs","501","542-8907">
<"Sam","Smith","sam@cs","501","542-8908">

Since the relation office(F,L,O) appears in the body of finger, ("Sam","Smith","501") is also true, and office "501" is known to have at least two phones: "542-8907" and "542-8908".

The methods of the invention do not assume that query operators are guaranteed to return from their information sources all tuples that are possibly part of the information domain model relations. This is the appropriate semantics for operators, since most data sources are incomplete. For example, the telephone white pages do not show all phone numbers, since some are unlisted. The SABRE™ flight database does not record all flights between two points on a given day, because some airlines are too small to be included. As a result of inherent database incompleteness, often multiple operators must be executed in order to be sure that as many tuples as possible have been retrieved. If it is known that a site does contain all tuples, this can be specified this by using "⇔" to separate the operator head and body.

As another concrete example, the legacy UNIX command userid-room generates email addresses, E, for the occupants of office O. This can be modeled by the identically named operator.

userid-room($O,E)⇒office(F,L,O)∧email(F,L,E)

Note that this operator does not return values for the first and last names associated with each email address E. Nevertheless, variables, e.g., F and L, ranging over these attributes of email and office are necessary to define the query in terms of the relations in the information domain model; such variables are said to be unbound. The interpretation is as follows: if userid-room returns a tuple such as <"1501","sam@cs"> then there exists F and L such that office(F,L,"501")∧email(F,L"sam@cs") is known to be true. In other words, the body of the operator is satisfiable.

The examples of finger and userid-room illustrate encodings of legacy systems. For example, UNIX finger can be thought of as having access to relational data about names, email addresses, phone numbers and offices, but not supporting arbitrary relational operations. If a user wished to know the email address of everyone whose phone number was "555-1212," finger would be of little use.

Binding patterns, i.e., a specification of bound variables in an operator's head, are a convenient way to describe legacy information sources, because they indicate the type of queries supported by such sources. When a source supports several types of queries, but doesn't support full relational operations, it can be described with several operators with various binding patterns. Bound arguments in an operator's head represent a form of query precondition. Full relational databases are simply described using operators with no bound variables or preconditions.

Representing User Information Queries

Queries are represented similarly to operators. A query has a head, which is a predicate symbol and an ordered list of arguments, with bound arguments being prefixed with "$." A query also has a body, which is a conjunction of relational schema in the information domain model. However, the direction of the implication symbol is reversed. The interpretation is that any tuple satisfying the conjunction of information domain relations represented by the body is a tuple that also satisfies the query. For simplicity, a constant is often substituted in place of a bound variable in the following description.

For example, a user who wants to know the first-names of the occupants in an office can issue the query query-for-first-names($O, F)⇐office(F,L,O)

This query has two arguments, O and F; the binding pattern indicates that O must be bound, e.g., to "429," before the query is executed. Since F has no "$" prefix, the query is requesting a set of values for that variable. For example, if Joe Researcher and Jane Goodhacker are the occupants of office 429, then the tuples <"429","Joe"> and <"429", "Jane"> are possible answers for this query.

In contrast to an operator, which is an abstract representation of an information source's capabilities, an operator instance, which is an operator whose arguments have been instantiated with variables, represents the action of accessing a specific information source. Formally, an operator instance is an atomic formula whose predicate symbol is an operator name. Thus userid-room($O_1$, $E_1$) and userid-room ($O_2$,$E_2$) are distinct operator instances, in which the indicated variables stand for information tuples returned from operator execution.

Representing Plans And Solutions

Plans are a specification of an ordered execution of operators against their information sources, which are designed to retrieve the information sought in a user query. For example, if an information source stored the complete office relational schema in a relational database, then query-for-first-names("429",F) could be answered by evaluating an SQL-based operator. However, if the data repository doesn't support relational operations or if the data forming the office relation is distributed across multiple sites, then multiple operator executions can be needed. For example, using the previously described UNIX operators, the best way to satisfy the example query is to first execute userid-room, which returns bindings for the email addresses of the office's occupants, followed by repeated execution of finger for each binding of E returned by userid-room, and then to discard all information returned except for the first-name. This ordered execution of legacy operators together with instructions for handling the returned tuples is an exemplary plan for this query.

In more detail, a plan also has a head, a body, and an implication symbol. In this case, however, the body is an ordered conjunction of operator instances. For example, the previous example can be encoded as the two step plan:

plan("429",F)⇒userid-room("429",E)∧finger(F,L,E, "429",Ph),

There are two ways of interpreting the body of a plan. Preferably, the body is interpreted procedurally, in which case the order of the operator instances is meaningful. In particular, the order determines whether operator binding patterns are satisfied during sequential execution of information source queries. Alternatively, the body can also be interpreted merely as a logical conjunction in which case the order is unimportant. A plan's head represents the information actually returned to the user. For example, although execution of finger gathers information about people's last names, the plan shown doesn't return this information to the user.

Given a user query and description of information sources, the planning methods of this invention construct a plan whose execution retrieves information satisfying the query. More precisely, a plan plan($X_1, \ldots, X_n$)⇒$O_1$∧ . . . ∧$O_k$ is a solution to a query query($Y_1, \ldots, Y_n$)⇐$rel_1$ ( . . . , $Y_i, \ldots$)∧ . . . ∧$rel_m$( . . . , $Y_j, \ldots$ ) if the following two criteria are satisfied.

1. First, the binding patterns of the plan's operator instances are satisfied. Specifically, if $V is a bound variable of $O_j$ then V either is a free variable of some other earlier operator instance $O_i$, where i<j, or else is a value for V that is a bound variable in the query head.
2. Second, all tuples satisfying plan($X_1, \ldots, X_n$) also satisfy query($X_1, \ldots, X_n$). In other words, the following implication holds for all $c_1, \ldots, c_n$:

plan($c_1, \ldots, c_n$)⇒query($c_1, \ldots, c_n$)

where each $c_i$ is a constant.

For example, the previously described plan, plan, is a solution to query-for-first-names because both these conditions are met. First, the binding patterns are satisfied: userid-room has only one bound variable, $O, and it is bound to "429" by the query head; and finger has only one bound variable, E, and it is bound by the earlier execution of userid-room. Second, every tuple returned by the plan satisfies query-for-first-names("429", F). To demonstrate the latter, suppose the tuple of constants <$c_1, c_2$> is returned by the plan. The following logical implications hold.

plan($c_1,c_2$)⇒userid-room($c_1$,E)∧finger($c_2$,E,$c_1$,Ph)

⇒office($F_0,L_0,c_1$)∧email($F_0,L_0$,E)

∧email($c_1$,L,E)∧office($c_2$,L,$c_1$)

∧phone(O,Ph)

⇒office ($c_2$,L,$c_1$)

⇒query-for-first-names ($c_1,c_2$)

Thus any tuple ($c_1, c_2$) satisfying plan ($c_1, c_2$) also satisfies uery-for-first-names ($c_1, c_2$). Hence, the plan is a solution to the query.

5.2. THE METHOD OF INFORMATION ACCESS

Figure 2:
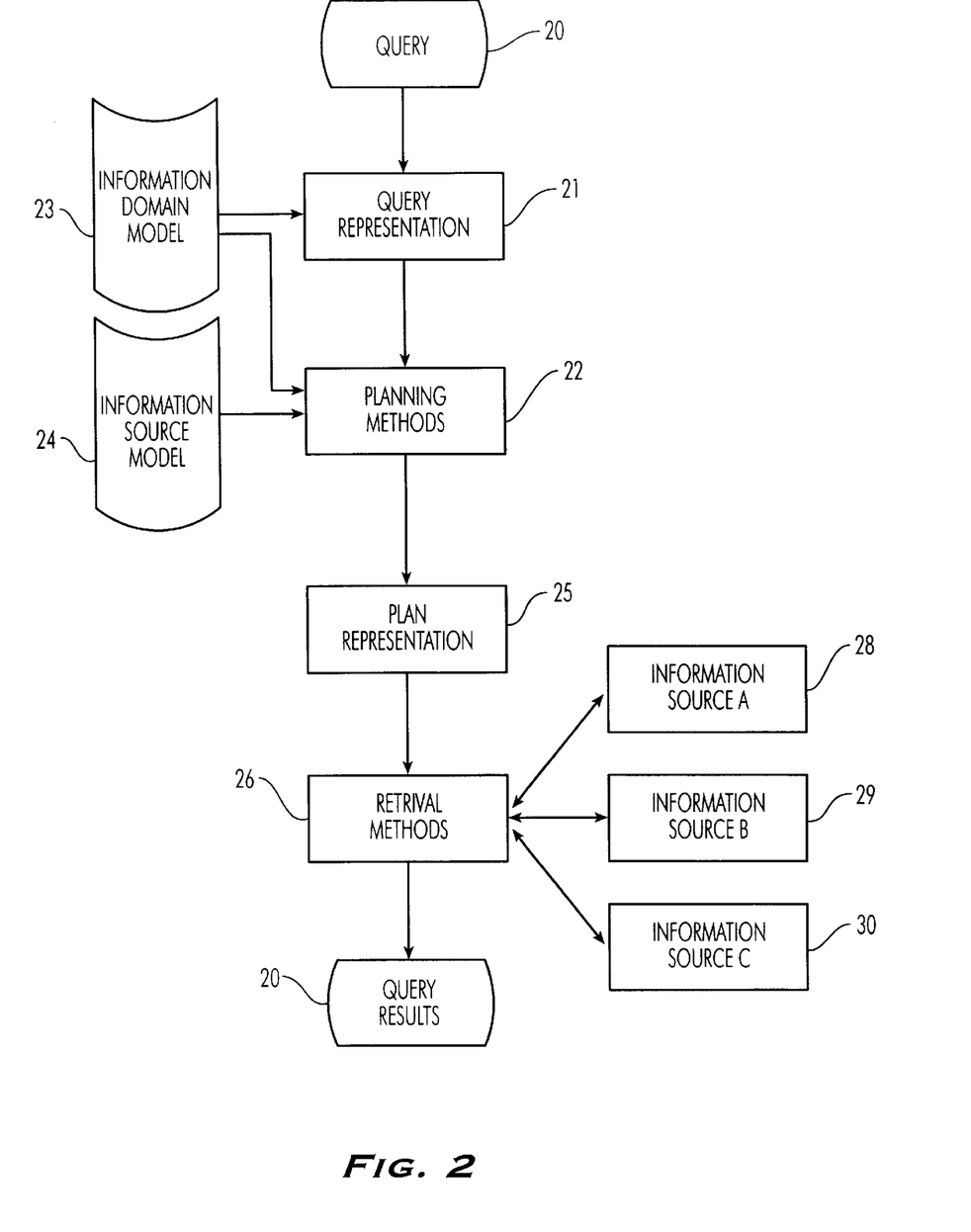
FIG. 2 illustrates the general method of this invention.

FIG. 2 illustrates generally the methods of information location and retrieval according to this invention. These methods execute in such systems as the access system generally indicated at reference numbers 2 and 8 of FIG. 1.

Turning to FIG. 2, first, a user inputs an information query at user interface device 20. By reference to information domain model 23 which is appropriate to the domain of the query, this entered query is converted into the previously described query representation in terms of the relational schema of the domain model. Next, planning methods 22 take the query so represented, and, with reference to domain model 23 and information source model 24, determine plan 25, which specifies an ordered sequence of accesses to the information sources together with instructions for presenting the returned tuples to the user. In this case, the plan specifies access to information source A 28, source B 29, and source C 30. The plan, is passed to retrieval methods 26, which actually perform the accesses to the networked information sources, retrieve returned data, and pass it to the user. Upon completion of processing, the result tuples are displayed on user interface device 20.

The planning methods are described in detail in the following section. Concerning retrieval methods 26, plan 25 passed to the retrieval methods has a body including an ordered list of query operator instances with specifications concerning how to instantiate bound variables of the operators, the binding patterns. Accordingly, the retrieval methods remove the first operator instance from the list, instantiate any bound arguments from values in the query head, submit it to its indicated information source, wait for a response, and save all returned tuples. Upon receiving a response, the retrieval methods extract the second operator instance from the list, instantiate any bound arguments from values in the operator head and values returned from the first operator instance, submit it to its indicated information source, wait for a response, and save all returned tuples. The retrieval methods execute similarly all remaining operator instances on the list. When the list is empty, retrieval methods 26 form tuples for presentation to the user by selecting data values from the returned tuples according to the list of arguments in the head of the plan.

This invention is adaptable to such alterations and optimizations to these methods as are apparent to one of skill in the arts. For example, plans for often repeated queries can be cached in a database, and planning method step 22 omitted for such queries.

5.3. THE METHOD OF PLANNING INFORMATION ACCESS

In this section the planning, or information source locating, methods of this invention are described. These methods are generally presented with respect to a preferred embodiment expressed in exemplary pseudocode. This invention is also adaptable to other expressions and transformations of this pseudocode that will be apparent to one of skill in the art from studying the following disclosure. The pseudocode generally relies on common knowledge in the art for the generation and representation of various data structures, including those for the representation of set, mapping, and combinatorial objects. See, e.g., Lewis et al, 1991, *Data Structures and Their Algorithms*, HarperCollins Publishers, Inc., New York, and Russell et al., 1995, *Artificial Intelligence: A Modern Approach*, Prentice Hall, Englewood Cliffs, N.J., both of which are incorporated herein in their entireties.

The following pseudocode presents an embodiment of the general planning method as a procedure named hereinafter "occam."

---
PROCEDURE OCCAM
---
Procedure Occam (Q, O)
    Fringe = {<>}
    Sol = {}
    Loop until either { Fringe = {} / Resource bound reached
        Choose and remove Seq from Fringe
        $\beta \leftarrow$ the set of all variables in Seq. $\cup$ the values of bound vars in Q
        For each Op $\in$ O
            For each $Op_i \in$ InstantiateOp (Op, $\beta$)
                $Seq_i \leftarrow$ Append (Seq, $Op_i$)
                Fringe $\leftarrow$ Fringe $\cup \{Seq_i\}$
                Sol $\leftarrow$ Sol $\cup$ FindSolutions ($Seq_i$, Q)
Return Sol

---

This embodiment generally employs a forward-chaining methodology to search from a set of operators, which describe available information sources, to a goal, which is a plan "solving" the query in terms of these information sources. Therefore, the input to this procedure is a user query, Q, and a set of operators, O, representing the queries available at the information sources of the information domain relevant to a user query. The output returned in set "sol" is one or more plans for solving, or satisfying, the query. Each plan is an ordered set of operator instances, or specific queries, together with a prescription for the selection of returned data to form tuples satisfying the query.

In more detail, this procedure makes use of two temporary data structures: "fringe," which is a set of candidate, ordered sequences of operator instances; and "sol," which is a set of plans which solve the query. Starting with fringe containing only the empty sequence, procedure occam searches iteratively through the totally ordered sequences of operator instances, which are possible plan bodies. Since there is no bound on the length of useful plans, procedure occam's search proceeds within the loop until all alternatives have been exhausted, or until a resource bound is exceeded. At each iteration of the loop, a sequence, called "seq," of operator instances is removed from the set fringe, and is expanded by postpending, by sub-procedure Append, any possible instances of each input operator in set O. For each input operator, any such instantiated instances are generated by sub-procedure Instantiateop, which uses as input the set $\beta$ of all variables that would be bound at this stage of execution of seq if it were part of a plan. Since operators can generally be instantiated in several ways, expanding seq typically causes many new operator instance sequences to be added to the set fringe. In the final step of the loop, sub-procedure FindSolutions determines if any of these newly constructed sequences can be converted into a solution plan, as is explained subsequently. All newly discovered solutions are added to set sol, but in any case every newly constructed sequence is kept in set fringe, because its children can possibly lead to different solutions.

The planning and location methods embodied in procedure occam are sound and complete. Soundness follows from two facts: first, sub-procedure Instantiateop only returns operator instances whose bound variables are chosen from the set $\beta$ which procedure occam calculates to be precisely those satisfying the binding constraints; second, sub-procedure FindSolutions constructs a containment mapping which suffices to compute logical entailment for this language. Completeness follows from the fact that procedure occam performs an exhaustive search, up to a determined depth bound, of all possible sequences of operator instances that satisfy the binding constraints. Since sub-procedure FindSolutions enumerates all possible heads, all possible plans are considered, and all non-redundant plans solving the input query are returned.

The following paragraphs describe these sub-procedures in more detail together with continued discussion of the previous legacy UNIX example. The section closes with a description of preferred optimizations to the basic procedures The Sub-procedure InstantiateOp The following pseudocode presents an embodiment of the sub-procedure Instantiateop, which finds variable bindings for argument of operators.

---
SUB-PROCEDURE INSTANTIATEOP
---
Procedure InstantiateOp(Op, $\beta$)
    Instances $\leftarrow$ {}
    For each variable, $V_i$, in Args(Op)
        If $V_i$ is bound, then Val($V_i$) $\leftarrow \{X \in \beta \mid SameType(X, V_i)\}$
        Else if $V_i$ is free, then Val($V_i$) $\leftarrow$ {a newly generated variable}
    For each tuple $<X_1, \ldots, X_n>$ in the cross product Val($V_1$) x ... x Val($V_n$)
        Generate a new operator instance $Op_i$ such that
            Name($Op_i$) $\leftarrow$ Name(Op)
            Args($Op_i$) $\leftarrow <X_1, \ldots, X_n>$
        Instances $\leftarrow$ Instances $\cup \{Op_i\}$
Return Instances

---

In more detail, the input to this sub-procedure is an operator, Op, and the set, $\beta$, of variables currently bound at this stage of potential plan execution. For each bound argument, V, in Op, InstantiateOp checks whether there are any already bound values in the set $\beta$ that are of the same type as V. If so, V is set to these values; if not, the binding pattern of Op cannot currently be satisfied, and no instances are generated by InstantiateOp. If V is a free argument in Op, then it is bound to a new value. Finally, operator instances are returned for all possible combinations of the just determined binding values of the variables of Op.

The Sub-procedure FindSolutions

The previous paragraphs described how procedure Occam searches through the totally ordered sequences of operator instances having satisfied binding patterns. This section explains how sub-procedure FindSolutions tests each such ordered sequence found to determine whether it can be elaborated into one or more solutions to the input query. There is a difference between a plan and a sequence of operator instances. A plan is represented as an operator, and as such it has both a head and a body, the body determining which actions get executed while the head determines what data gets returned, whereas a sequence of operator instances has no head.

Given a sequence, $O_1 \wedge \ldots \wedge O_k$, of operator instances, FindSolutions determines whether there exist any plans of the form plan $(X_1, \ldots, X_n) \Rightarrow O_1 \wedge \ldots \wedge O_k$ that are solutions to the query. A totally ordered sequence of operators is under specified because there could be several, or no, heads which combine with it to form a solution. Sub-procedure FindSolutions is illustrated in the following pseudocode.

---

SUB-PROCEDURE FINDSOLUTIONS

Procedure FindSolutions(Seq, Q)
Sol ← {}
E ← ∧ Body(Op$_i$)
    Op$_i$∈Seq
V$_E$ ← the set of all symbols in E
V$_Q$ ← the set of all symbols in Q
For each potential containment mapping τ : V$_Q$ → V$_E$
    For each equality mapping ζ : V$_Q$ → V$_E$
        If τ (Body(Q)) ⊆ ζ (E)
        Then P ← a plan with head plan (τ(Args(Q)))
            and body ζ (Seq)
        If p is not redundant, then Sol ← Sol ∪ {P}
Return Sol

---

According to the definition of a solution, there are two requirements for a plan to be a solution to a query. A first condition is that the binding patterns of the plan body's operator instances must be satisfied. Sub-procedure FindSolutions doesn't need to check this criterion because sub-procedure Instantiateop only instantiates bound variables with values satisfying the binding patterns. The second conditions is that all tuples satisfying plan$(X_1, \ldots, X_n)$ must satisfy query$(X_1, \ldots, X_n)$. According to the preceding pseudocode, FindSolutions takes a sequence and generates the set of all plans, having that sequence for their body, whose tuples are guaranteed to satisfy the query. These plans are thus solutions.

In order to determine if plan heads can be generated, sub-procedure FindSolution utilizes containment mappings between two horn clauses. See, e.g., [28], p 881. A containment mapping from query Q to the formula E, both horn clauses, is a function T mapping symbols in Q to symbols in E. If there exists a mapping such that the τ(Args(Q)) equals the arguments of E, then E logically entails Q. Therefore, Q is the body of a plan.

When FindSolutions is given a sequence of operator instances, i.e. a candidate plan body, it first computes the expansion of the sequence by setting local variable E to the conjunction of the bodies of the operators in the sequence.

Local sets $V_E$ and $V_Q$ are defined in order that FindSolutions can search through potential containment mappings. This search can be optimized by the use of type information and other methods, as will be apparent to one of skill in the art, in order to achieve increased efficiencies. If sub-procedure FindSolutions can find a containment mapping from the query to the expansion E such that the image of the body of Q is contained in E, then this mapping enables the construction of a plan head guaranteeing that all tuples returned by the plan satisfy the query.

FindSolutions also considers possible equality mappings which have the effect of requiring that two or more variables in E are constrained to be equal. Equality mappings are necessary in order to determine a plan solution in the case of certain queries. FindSolutions's inner loop searches through possible equality mappings, that is functions of the form $\zeta: V_E \to V_E$. By performing this search, FindSolutions considers the possibility of constraining one or more of the variables in the expansion to be equal. For example consider the query query-same-names($E, F)⇐email(F,F,E)

which looks for people with a given email address whose firstnames and lastnames are the same. The sequence finger($F_0,L_0,$E,O_0,Ph_0$), which has expansion email ($F_0$, $L_0$,E) ∧office($F_0,L_0,O_0$)∧ phone($O_0,Ph_0$), might lead to a solution, but there is no possible containment mapping from email(E,F,E) to email($F_0$, $L_0$, E), because the image of F would have to be both $F_0$ and $L_0$. FindSolutions generates a solution by constraining $L_0=F_0$ with the equality mapping that sets $\zeta(F_0)=L_0$. As a result $\zeta(E)$ contains the conjunct email($F_0$, $F_0$, E), and the containment mapping $\tau(F)=F_0$, $\tau(E)=E$ demonstrates the logical entailment required for a plan to be a query solution. Thus Findsolutions recognizes a solution corresponding to executing a finger command and then discarding all returned tuples whose first and last names are not equal.

Finally, the last line of the inner loop of FindSolutions checks whether a plan is redundant, and adds it to the set of solutions to be returned only if it is not redundant. A plan is redundant if operator instances can be eliminated from the plan with the plan remaining a solution. This check is important to minimize combinatorial search explosions. Since every super-sequence of a sequence of operator instances that generate a solution also generates that solution, and since that procedure occam keeps all sequences on the set fringe, even when they have produced solutions, not removing redundant plans generates a greatly increased number of plans with unnecessarily increased information source access queries.

However, it is preferable to keep solution sequences on set fringe, because some super-sequences can yield qualitatively different solutions to a query that should not be discarded. Such different solutions are illustrated by the following example, having the set of operators.

op$_1$ (X)⇒rel$_1$(X),
op$_2$ ($X,Y)⇒rel$_2$(X,Y),
op$_3$ (X,Y)⇒rel$_2$(X,Y)∧rel$_1$(Y), and a user query query(X)⇒rel$_1$(X). The following plans are solutions to the query.

plan1(A)⇒op$_1$(A)
plan2(A)⇒op$_1$(A)∧op$_2$(A,B)
plan3a(A)⇒op$_1$(A)op$_3$(A,B)
plan3b(B)⇒op$_1$(A)op$_3$(A,B)

Plan1 is a solution to the query. Although plan2 is also a solution, it is redundant because elimination of the second conjunct yields plan1. Because the sequence op$_1$(A)∧op$_3$ (A,B) is a superset of plan1's body, it also leads redundant solution plan3a. Since this latter plan can return a different set of tuples, than plan1, it is retained and returned by FindSolutions. Checking for redundancy is fast, taking time that is $O(l^2 eg)$, where l is the length of the plan, e is the number of relations in the expansion and g is the number of relations in query body.

The UNIX Command Example

Returning to the example of the legacy UNIX commands, suppose procedure occam is called on the query-for-first-names query. When the empty sequence is removed from set fringe and assigned to variable seq, the occam procedure considers adding instances of operators finger and userid-room. Since there are no variable instances in the empty sequence seq, β is assigned the value {"429"} because that is the only constant provided as input by the query.

When InstantiateOp is called with userid-room, the procedure creates val sets corresponding to userid-room's two arguments, the bound O and the free E. Variable O could be assigned any value in β that has a type which is consistent with the type "office." Since both "429" and O are of type "office," val(O)={"429"}. If there had been a type conflict, then val(O) would have been empty and InstantiateOp would have returned no instances. Since E is free, val(E) is assigned a set containing a newly generated variable, {$E_o$}. Since both Val sets are singletons, there is only one pair in the cross product. Hence, InstantiateOp returns a single instance to occam: userid-room("429", $E_o$).

In some later iteration of the loop occam, Seq=userid-room("429", $E_o$) is removed from set fringe. β is then assigned the value, {"429", $E_o$}. Thereby, after executing userid-room, there is a set of possible values for $E_o$ and thus that variable can be used when instantiating future instances that have bound arguments.

Once again occam considers adding instances of finger and userid-room. When it chooses the former, it creates val sets for finger's arguments: F, L, E, O, Ph. Since all of these arguments except E are free, their Val sets will contain a single newly generated variable, e.g., {$F_1$}, {$L_1$}, {$O_1$}, {$Ph_1$}. Although there are two members of β, only one has type email address, so Val(E)={$E_o$}. Therefore InstantiateOp returns a single instance to the inner loop of occam, that is finger ($F_1$, $L_1$, $O_1$, $Ph_1$). Thus the following sequence is formed.

userid-room("429", $E_o$)∧finger($F_1,L_1,E_1,O_1,Ph_1$),

This sequence is added to Fringe, and in addition it is passed to FindSolutions, in order to see if it could be elaborated into a solution to the query.

Given these arguments, FindSolutions expands the sequence, giving E the following value:

office($F_0,L_0$, "429")∧email($F_0,L_0,E_0$)∧
email($F_1,L_1,E_0$)∧office($F_1,F_1,O_1$) ∧phone($O_1,Ph_1$)

$V_Q$ becomes {"429",F,L} and $V_E$ becomes {$F_0,L_0$, "429", $E_0,F_1,L_1,O_1,Ph_1$}. Next, FindSolutions tries different ways to map variables from $V_Q$ to $V_E$. Eventually, it considers the following mapping: τ("429")=$O_1$, τ(F)=$F_1$, and τ(L)=$L_1$. If the equality mapping ζ is taken to be the identity mapping, then applying τ to the query body yields the singleton sequence office($F_1, L_1, O_1$), which matches one of the conjuncts in E. Therefore a new plan P is formed:

plan($O_1$, $F_1$)⇒userid-room("429",$E_0$)∧finger($F_1,L_1,E_0$, $O_1,Ph_1$)

Since P is not redundant, as previously described, it is saved as a solution in set sol. In this example, there are no other solution plans with userid-room∧finger as body, but in some cases there exist several heads that make a sequence into a solution. When this happens, FindSolutions returns all such plans.

Procedure Optimization

Although the method as previously described is efficient, there are two optimization that reduce the number of plan bodies explored by procedure Occam's search processes and improve efficiency. Duplicated operator instance pruning eliminates redundant instances. Shuffled sequence pruning achieves the efficiency benefits of a partial-order representation without the attendant complexity. Both of these techniques are domain-independent and completeness-preserving, in that they do not cause the planning methods to miss useful solutions. Furthermore, experimental data presented subsequently demonstrates that these optimization techniques are complementary. When used in combination, they provide on average an order of magnitude speedup.

Turning first to duplicated operator instance pruning, two instances, O and O', of an operator are equivalent, written as $O \stackrel{op}{=} O'$, if all the bound arguments of O are equal to the variables in O'. For example userid-room(A,B)$\neq^{op}$userid-room(C,B), but userid-room(A,B)=$^{op}$userid-room (A, C), because only the first variable is bound in the definition of this operator. This optimization rejects any sequence that contains two equivalent operator instances. This test is preferably accomplished in sub-procedure InstantiateOp by incrementally checking for the presence of an equivalent instance before postpending new instances returned by the call to InstantiateOp. That is, the sequence is rejected if the new operator instance has the same bound arguments as an existing step, since executing the same operator with same bound arguments twice will not return any new tuples. For example, the plan userid-room("429",E)∧finger(F,L,E,O,Ph)∧userid-room ("429",$E_1$) is rejected by this optimization, because userid-room is executed twice with the same bound argument "429".

Turning next to shuffled sequence pruning, since the methods of this invention generate sequences that are totally ordered, they consider different orderings of operator instances even when the precise order does not matter. For example, given the following operators $op_1(X,Y) \Rightarrow rel_1(X,Y)$
$op_2($X,Y) \Rightarrow rel_2(X,Y)$ the following two incomplete sequences $s_1$: $op_1(A,B) \wedge op_2(A,C) \wedge op_2(B,D)$
$s_2$: $op_1(A,B) \wedge op_2(B,D) \wedge op_2(A,C)$ would be considered by procedure Occam, but in fact one or the other can be discarded without losing completeness, or query information.

In prior systems, this combinatorial explosion has been controlled by the use of a partial-order representation. This invention adopts the simpler and more efficient approach of enforcing a canonical ordering which eliminates redundant permutations.

Operator instance $O_i$ is defined to be dependent on operator instance $O_j$ if either $O_i$ has a bound argument that appears as a free variable in $O_j$, (also known as "direct dependence") or There exists an instance $O_k$ such that $O_i$ is dependent on $O_k$ and $O_k$ is dependent on $O_j$ (also known as "transitive dependence").

Two operator instances are independent if neither is dependent on the other. If two operator instances are independent, then procedure Occam does not need to explore both ordering permutations.

To avoid this redundancy, this optimization assigns a unique number InstanceID($O_i$)=InstanceID($O_j$) if and only if $O_i \stackrel{op}{=} O_j$. When creating new sequences by adding operator instances O to an existing sequence, procedure Occam bypasses a creation in which the new instance O is independent of an existing operator instance $O_i$ and InstanceID (O<InstanceID($O_i$).

Returning to the example above, suppose the following InstanceIDs are assigned: InstanceID($op_1$(A, B))=1, InstanceID($op_2$(A,C))=2 and InstanceID ($op_3$(B,D))=3. To construct $s_2$, add $op_2$(A,C) to the sequence $op_1$(A,B)∧$op_2$(B,D). However $op_2$ (B,D) is independent of $op_2$(A,C), and InstanceID($op_2$(A,C))<InstanceID($op_2$(B,D)), so this addition is redundant and $s_2$ is pruned. $s_1$ is the only sequence that consists of all three of the operator instances in the search space. Additionally, procedure Occam can reorder sequences in operator instances to achieve execution efficiency.

The following experimental data demonstrates the efficiency of these optimization. The experiments consisted of five problems in the following four domains.

The Parent domain has two operators. See, e.g., [25].
The Patho domain consists of the three operators. See, e.g., [25].
The Car domain models relational databases containing price information on foreign and domestic cars with five operators that use numerical constraints to encode price and date restrictions.
The People domain encodes Internet white page operations with ten operators. See, e.g., [9].

In each experiment procedure Occam exhaustively explored all sequences up to a certain length. The number of sequences explored and the time taken for each experiment is shown in Table 1. Each experiment is run with procedure Occam without any of the two described optimizations, the "plain" column, then with procedure Occam with duplicated operator instance pruning, the "no duplicate" column, and finally with procedure Occam with duplicated operator instance pruning and shuffled sequence pruning, the "no duplicate/no shuffle" column. This experiment demonstrates that the search control optimizations provide two orders of magnitude speedup.

TABLE 1

OPTIMIZATION EXPERIMENTS

| Query | | plain | no duplicate | no duplicate no shuffle |
|---|---|---|---|---|
| find-grandparent | explored | 46232 | 8852 | 413 |
| (depth 7) | time | 23 | 3 | <1 |
| Patho q(X) | explored | 598443 | 163531 | 10024 |
| (depth 7) | time | 364 | 65 | 2 |
| Car query | explored | 97655 | 97655 | 2310 |
| (depth 7) | time | 975 | 975 | 8 |
| query-for- | explored | 62808 | 22307 | 8480 |
| first-names | time | 346 | 88 | 9 |
| (depth 6) | | | | |
| find-email | explored | 14249 | 11141 | 5257 |
| (depth 4) | time | 19 | 16 | 2 |

Additional Enhancements To The Methods Of This Invention

Network information services are potentially slow and expensive, therefore one enhancement to the methods of this invention is to find the simplest plans that gather information requested by the user. Procedure Occam can do so by recording the price and expected time required by an information source, and then using this information to guide its search by picking the expected least cost sequence from set fringe.

Users can also impose resource bounds on a query. Specifying a price bound of zero on a query prevents the planning methods from considering any sequence that costs money. Procedure Occam finds the simplest plans using these criteria. However, estimating the cost of an operator sequence can be difficult. In particular, operators encoding accesses to legacy systems can need multiple sequential executions, once for each tuple returned from some other information source that instantiates their query variables. Procedure Occam can represent this problem by estimating the execution complexity of a sequence. The number of tuples returned on average from an information source returns is estimated. This number is then multiplied by the cost of the operators that use tuples from this source to arrive at an estimate of the total execution cost. This cost estimate can also guide sequence selection from set fringe.

5.4. ALTERNATIVE EMBODIMENT

An alternative embodiment of the information locating and query planning methods of this inventions utilizes a backward-chaining algorithm. Such a method starts from the goal, the user information query to be satisfied, and expands it into a list of instantiated operators, or information source queries, which return the required information. This method described is a sound, complete, partial-order planner, which is also free of threats and does not require consistency checking.

For the description of this alternative method in this section, a user information query is taken to be a conjunction of predicates together with a list of variables and an indication for each whether it is bound or unbound. Execution of the instantiated queries against their represented information sources, also called "actions" in this section, is partially ordered by two types of point truth constraints, one representing the binding pattern of variables in a predicate and another representing true predicates.

Further, for this method, all variables are typed, and are also either bound or unbound. Free variables can be merged with unbound variables. Unbound variables are associated with actions, also called steps, and are like effects.

This method is exemplified by the following pseudocode which uses the following definitions and variable names.

1) Set I is the set of bound variables in the user information query.
2) Set O is the set of unbound variables in the user information query.
3) Variable G stands for the agenda of predicates.
4) Variable S stands for queries representing information sites.
5) Variable A stands for instantiated actions, also called steps, which are instantiated queries to information sites.
6) Variable V stands for the variables in a predicate or expression.
7) Variable P stands for predicates.
8) Variable PP stands for plans or partial plans.

A partial plan is a list comprising, in order: actions; unsolved goals ("UG" of the PP); unbound variables ("UV" of the PP); ordering constraints for actions; and variable bindings. A plan without any unsolved goals is a solution of the user information query.

Initial PP=({last step, first step}, body of query, φ, φ);
I=unbound variables of the dummy first step of the initial PP;
Push Initial PP on G;
While (PP=Pop(G)) do \<A\>: Choose a goal predicate P from UG of PP;
  If none, then return PP as a query solution;
  Select a new S, or existing A, with a predicate P' in its description unifying with P AND having a non-empty intersection, VS, of UV and the unbound variables of P';
  Add the instance of S to the actions of PP and its bindings to the bindings of PP;
  Remove P from the UG of PP;
  UV(PP)←UV(PP)–VS+UV(S);
  Add an ordering constraint between the producing step and the steps associated with each variable in VS to PP;
OR
\<B\>: Choose a goal variable V from UV of PP;
  If there is an existing step that may be ordered before the step associated with V, which has an unbound variable unifying with V, i.e., of the same type and not already unified with a variable in the query, add the binding and ordering to PP;
  Else go to \<A\>;
End.

6. SPECIFIC EMBODIMENTS, CITATION OF REFERENCES

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims.

Various publications are cited herein, the disclosures of which are incorporated by reference in their entireties.

6.1. REFERENCES CITED

[1] J. Allen, J. Hendler, and A. Tate, editors. *Readings in Planning*. Morgan Kaufmann, San Mateo, Calif., August 1990.

[2] Yigal Arens, Chin Chee, Chun-Nan Hsu, Hoh In, and Craig Knoblock. Query processing in an information mediator. In *Proceedings of the ARPA/Rome Laboratory Knowledge-Based Planning and Scheduling Initiative*, Tucson, Ariz., 1994.

[3] A. Barrett and D. Weld. Partial order planning: Evaluation possible efficiency gains. *Artificial Intelligence*, 67(1):71–112, 1994.

[4] D. Chapman. Planning for conjunctive goals. *Artificial Intelligence*, 32(3):333–377, 1987.

[5] S. Chawathe, H. Garcia-Molina, J. Hammer, K. Ireland, Y. Papakonstantinou, J. Ullman, and J. Widom. The tsimmis project: Integration of heterogeneous information sources. In *Proceedings of IPSJ Conference*, 1994.

[6] D. Draper, S. Hanks, and D. Weld. Probabilistic planning with information gathering and contingent execution. In *Proc. 2nd Intl. Conf. on A.I. Planning Systems*, June 1994.

[7] O. Etzioni, K. Golden, and D. Weld. Tractable closed-world reasoning with updates. In *Proc. 4th Int. Conf. on Principles of Knowledge Representation and Reasoning*, pages 179–189, San Francisco, Calif., June 1994. Morgan Kaufmann.

[8] O. Etzioni, S. Hanks, D. Weld, D. Draper, N. Lesh, and M. Williamson. An Approach to Planning with Incomplete Information. In *Proc. 3rd Int. Conf. on Principles of Knowledge Representation and Reasoning*, San Francisco, Calif., October 1992. Morgan Kaufman. Available via FTP from pub/ai/at ftp.cs.washington.edu.

[9] O. Etzioni and D. Weld. A softbot-based interface to the internet. *CACM*, 37(7):72–76, July 1994. See http://www.cs.washington.edu/research/softbots.

[10] O. Etzioni and Daniel Weld. Intelligent agents on the internet: Fact, fiction, and forecast. *IEEE Expert*, pages 44–49, August 1995.

[11] R. Fikes and N. Nilsson. STRIPS: A new approach to the application of theorem proving to problem solving. *Artificial Intelligence*, 2(3/4), 1971.

[12] K. Golden, O. Etzioni, and D. Weld. Omnipotence without omniscience: Sensor management in planning. In *Proc. 12th Nat. conf. on A.I.*, pages 1048–1054, Menlo Park, Calif., July 1994. AAAI Press.

[13] A. Gupta, Garcia-Monlina H., J. Ullman, and Y. Papakonstantinou. A query translation scheme for rapid implementation of wrappers. In *Database and knowledge-base systems*, volume 1. Computer Science Press, 1989.

[14] Thomas Kirk, Alon Y. Levy, Yehoshua Sagiv, and Divesh Srivastava. The information manifold. In *Working Notes of the AAAI Spring Symposium: Information Gathering from Heterogeneous, Distributed Environments*, pages 85–91, Stanford University, 1995. AAAI Press. To order a copy, contact sss@aaail.org.

[15] C. Knoblock. Planning, executing, sensing, and replanning for information gathering. In *Proc. 15th Int. Joint Conf. on A.I.*, pages 1686–1693, 1995.

[16] Craig Knoblock and Alon Levy, editors. *Working Notes of the AAAI Spring Symposium on Information Gatherings from Heterogeneous, Distributed Environments*, Stanford University, 1995. AAAI Press. To order a copy, contact sss@aaai.org.

[17] K. Krebsbach, D. Olawsky, and M. Gini. An empirical study of sensing and defaulting in planning. In *Proc. 1st Intl. Conf. on A.I. Planning Systems*, pages 136–144, June 1992.

[18] Alon Y. Levy, Divesh Srivastava, and Thomas Kirk. Data model and query evaluation in global information systems. *Journal of Intelligent Information Systems, Special Issue on Networked Information Discovery and Retrieval*, 5 (2), September 1995.

[19] S. Minton, J. Bresina, and M. Drummond. Commitment strategies in planning: A comparative analysis. In *Proceedings of IJCAI-91*, pages 259–265, August 1991.

[20] S. Minton, M. Drummond, J. Bresina, and A. Phillips. Total order vs. partial order planning: Factors influencing performance. In *Proc. 3rd Int. Conf. on Principles of Knowledge Representation and Reasoning*, October 1992.

[21] R. Moore. A Formal Theory of Knowledge and Action. In J. Hobbs and R. Moore, editors, *Formal Theories of the Commonsense World*. Ablex, Norwood, N.J., 1985.

[22] Leora Morgenstern. Knowledge preconditions for actions and plans. In *Proceedings of IJCAI-87*, pages 867–874, 1987.

[23] E. Pednault. ADL: Exploring the middle ground between STRIPS and the situation calculus. In *Proc. 1st Int. Conf. on Principles of Knowledge Representation and Reasoning*, pages 324–332, 1989.

[24] M. Peot and D. Smith. Conditional Nonlinear Planning. In *Proc. 1st Intl. conf. on A.I. Planning Systems*, pages 189–197, June 1992.

[25] A. Rajaraman, Y. Sagiv, and J. Ullman. Answering queries using templates with binding patterns. In *Principles of Database Systems*, 1995.

[26] G. Sussman. *A Computer Model of Skill Acquisition*. American Elsevier, New York, 1975.

[27] J. Ullman. Database and knowledge-base systems. In *Database and knowledge-base systems*, volume 1. Computer Science Press, 1988.

[28] J. Ullman. Database and knowledge-base systems. In *Database and knowledge-base systems*, volume 2. Computer Science Press, 1989.

[29] D. Weld. The role of intelligent systems in the national information infrastructure. *AI Magazine*, 16(3):45–64, Fall 1995.

What is claimed is:

1. A method to retrieve information from one or more information sources in order to satisfy a user information query, said method comprising the steps of:

a. generating an ordered sequence of one or more operators, (i) wherein each said operator represents a type of query for retrieving information from one of said information sources, (ii) wherein each said operator has a representation comprising a head with zero or more bound arguments and with one or more free arguments, said bound and free arguments representing, respectively, input information required by, and output information returned from, said represented query type, (iii) and further wherein said user information query has a representation comprising a head with zero or more bound arguments and with one of more free arguments;

b. Instantiating each said ordered sequence of operators to form one or more ordered sequences of operator instances by replacing said bound and free arguments in each said operator and in said user information query with variables such that the binding pattern of said ordered sequence of operators is satisfied;

c. testing whether each said ordered sequence of operator instances satisfies said user information query, wherein said ordered sequence of operator instances satisfies said user information query if it returns information in its variables satisfying the free arguments of said head of said user information query; and d. repeating steps (a), (b), and (c) either until no additional said ordered sequences of operators can be generated or until a resource bound is exceeded.

2. The method of claim 1 further comprising after step (d) the additional steps of:

e. submitting each operator instance of one of said ordered sequence of said operator instances that satisfies said user information query to said represented information source, wherein said variables replacing said bound arguments of said operator have values either according to said user query or according to information already retrieved from said information sources;

f. assigning values to said variables replacing said free arguments of said operator instance according to information returned from said represented information source;

g. repeating steps (e) and (f) in order for all said operator instances of said ordered sequence of operator instances; and h. assigning values to the free variables in said user information query according to the information returned from said information sources in step (f), whereby said user information query is satisfied.

3. The method of claim 1 wherein said generating is according to a forward chaining method wherein a new one of said ordered sequences of operators is generated by appending an instance of one of said operators to a previous one of said ordered sequences of operators such that said binding pattern can be satisfied in said instantiating step.

4. The method of claim 3 wherein said appending and instantiating do not generate a new one of said ordered sequence of operators wherein the resulting ordered sequence of operator instances has two independent operators in a different order than said two independent operator instances have in an already generated ordered sequence of operator instances.

5. The method of claim 4 wherein two operator instances are independent if they are neither directly dependent nor transitively dependent, wherein two operator instances are directly dependent if there is a variable replacing a bound argument in one of said two operator instances and a replacing a free argument in the other of said two operator instances, and wherein two operator instances are transitively dependent if they are part of an ordered sequence of operator instances, each pair of adjacent operator instances being directly dependent.

6. The method of claim 1 wherein said arguments and said variables have one or more types, and wherein a variable can only replace an argument if they both have the same type.

7. The method of claim 1 wherein said binding pattern is satisfied if, for each operator instance in said ordered sequence of operator instances, all of its said bound arguments are replaced either by variables which replaced free arguments in previous operator instances in said ordered sequence of operator instances or are replaced by variables which replaced bound arguments in said head of said user information query.

8. The method of claim 1 (i) wherein said information sources are part of an information domain whose information content is represented by one or more relational schema, each said relational schema comprising a named predicate symbol and one or more arguments, (ii) wherein said operators and said user information query further comprise bodies comprising conjunctions of one or more of said relational schema, said conjunction comprising arguments including those of said heads of said operators and said user information query, respectively, (iii) and further wherein a said ordered sequence of operator instances satisfies said user information query if the variables replacing said arguments in the body of said user information query can be mapped to the variables in the conjunction of all the bodies of said ordered sequence of operator instances such that the body of user information query is contained in said conjunction of the bodies of ordered sequence of operator instances.

9. The method of claim 1 wherein said step of instantiating does not form an ordered sequence of operator instances in which two or more operator instances have bound arguments replaced by the same variables.

10. A computer system programmed according to the method of claim 1.

11. A computer system programmed according to the method of claim 2.

* * * * *